United States Patent
Cook

(10) Patent No.: US 9,151,690 B2
(45) Date of Patent: Oct. 6, 2015

(54) HOSE TESTER INTENSIFIER

(71) Applicant: Colin Donald Cook, Bedfordshire (GB)

(72) Inventor: Colin Donald Cook, Bedfordshire (GB)

(73) Assignee: GATES CORPORATION, Denver, CO (US)

( * ) Notice: Subject to any disclaimer, the term of this patent is extended or adjusted under 35 U.S.C. 154(b) by 398 days.

(21) Appl. No.: 13/721,436

(22) Filed: Dec. 20, 2012

(65) Prior Publication Data

US 2013/0152669 A1    Jun. 20, 2013

Related U.S. Application Data

(60) Provisional application No. 61/577,742, filed on Dec. 20, 2011.

(51) Int. Cl.
*G01M 3/02* (2006.01)
*G01M 3/04* (2006.01)

(52) U.S. Cl.
CPC .. *G01M 3/02* (2013.01); *G01M 3/04* (2013.01)

(58) Field of Classification Search
CPC .................................. G01M 3/04; G01M 3/02
USPC ................................................. 73/37, 40.5 R
See application file for complete search history.

(56) References Cited

U.S. PATENT DOCUMENTS

| 4,026,322 | A | 5/1977 | Thomas |
| 5,040,369 | A * | 8/1991 | Rapp ............................. 60/560 |
| 5,092,744 | A | 3/1992 | Boers et al. |
| 5,339,677 | A | 8/1994 | Haug |
| 5,879,137 | A | 3/1999 | Yie |
| 6,591,201 | B1 | 7/2003 | Hyde |
| 2011/0189041 | A1 * | 8/2011 | Zhang ........................... 417/560 |

* cited by examiner

*Primary Examiner* — Hezron E Williams
*Assistant Examiner* — David Z Huang
(74) *Attorney, Agent, or Firm* — Jeffrey A. Thurnau, Esq.; Paul N. Dunlap, Esq.

(57) ABSTRACT

This disclosure relates generally to systems and methods for testing hoses, and also to a configuration for an intensifier for increasing the pressure and temperature of oil within the hoses to be tested.

14 Claims, 3 Drawing Sheets

HOSE TESTER INTENSIFIER

REFERENCE TO RELATED APPLICATIONS

This application claims priority from U.S. provisional patent application No. 61/577,742 filed Dec. 20, 2011

BACKGROUND

This disclosure relates generally to systems and methods for testing industrial and automotive hoses, and more particularly to a configuration for an intensifier for increasing the pressure of oil within the hoses to be tested.

SUMMARY

The present disclosure is directed to systems and methods of indicating and determining service for an intensifier for a hose tester is required. An intensifier increases the pressure of a volume of oil within a test system of an industrial and automotive hose test system.

One drawback of this type of intensifier may be catastrophic failure of high pressure and temperature oil, possible causing injury to a person, and severe damage to the test system and intensifier. What is needed is a method and system for indicating a hose test system is failing, and/or service is needed, before a catastrophic failure.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings.

DETAILED DESCRIPTION

Figure 1:
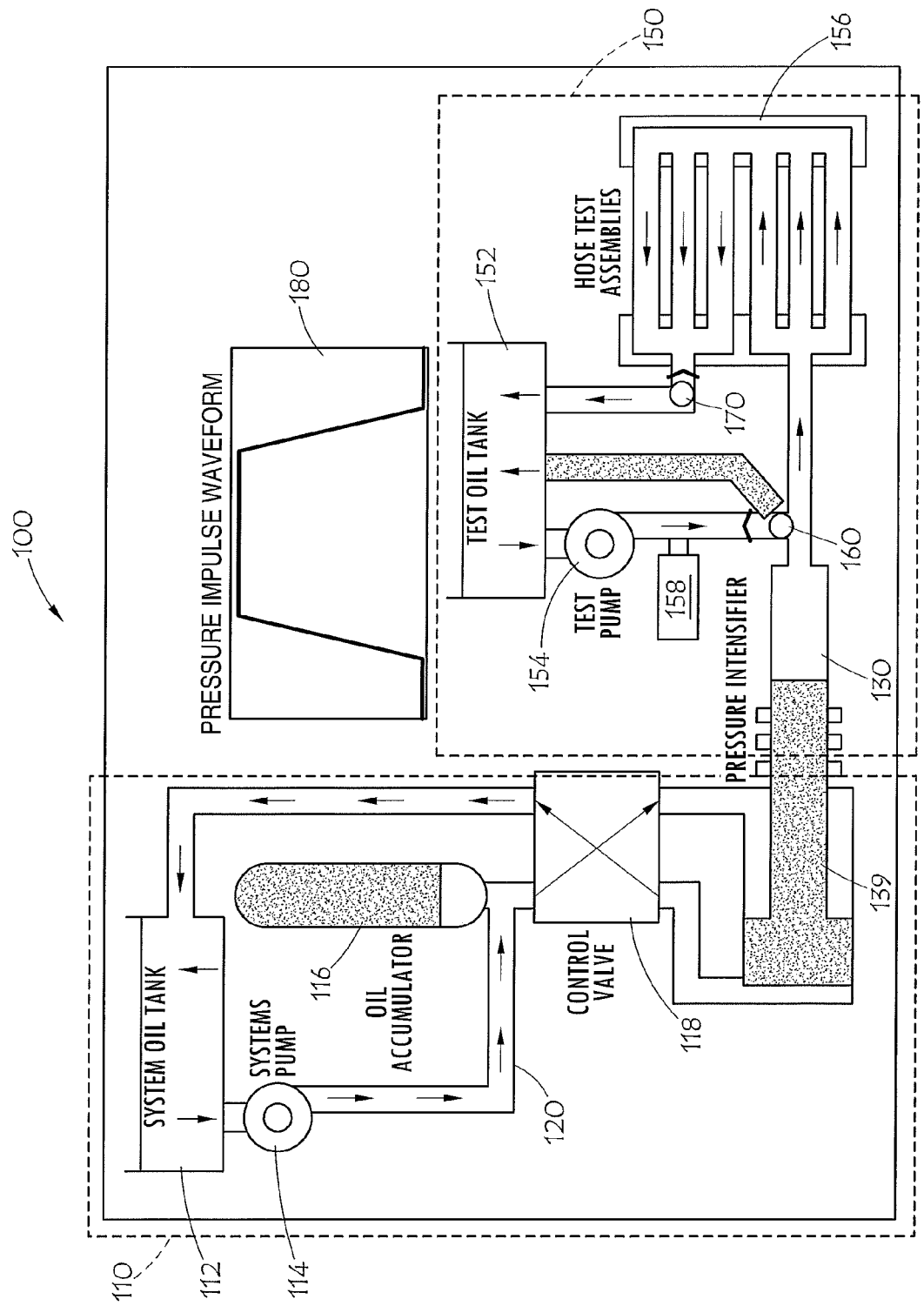
FIG. 1 is a block diagram of a hose tester at a low pressure state, according to an embodiment of the disclosure.

FIG. 1 shows a block diagram of a hose test system 100 during a low pressure cycle, as indicated by pressure waveform 180, according to an embodiment. Generally the right side of the pressure wave window indicates which portion of the cycle the system 100 is in. System 100 may include a control system 110, and a test system 150. The control system 110 may be configured to control the operation of an intensifier 130.

Control system 110 may include a system oil tank 112, a system pump 114, an accumulator 116, a control valve 118, and interconnecting piping 120.

System oil tank 112 may function as a storage tank for the oil/liquid used with control system 110. System pump 114 may be operatively coupled to system oil tank 112 and piping 120 to circulate oil throughout the system 110. System pump 114 may also function to fill accumulator 116.

Accumulator may be used to store oil to actuate intensifier 130. System pump 114 may not be able to pump enough oil fast enough to actuate intensifier 130. Thus Accumulator is needed to accomplish the pressure characteristics needed from the output of intensifier 130. Control valve 118 may function to direct flow of oil to and from intensifier 130 and accumulator 116, as well as throughout the system 110.

In the low pressure embodiment shown in FIG. 1, as indicated by pressure waveform 180, oil may flow to intensifier 130 to move piston 139 back to a non-actuated position. In this position control valve may also direct flow of oil throughout the system 110, and to and from system oil tank. During this low pressure phase, accumulator 116 may also be filled to prepare for the next high pressure stage of operation. Furthermore, oil may be generally circulated throughout the system 110.

According to embodiments, test system 150 may include a test oil tank 152, test pump 154, hose test assembly 156 and oil temperature control system 158. Test system may also include an inlet high pressure valve 160 and an outlet high pressure valve 170.

Test oil tank 152 may function as a storage tank for the test oil/liquid used with test system 150. Test pump 154 may be operatively coupled to system oil tank 152 and piping to circulate test oil throughout the test system 150.

Oil temperature control system 158 may function to keep the temperature of the test oil within an acceptable range. Oil temperature control system 158 may include heaters and coolers as well as heat exchangers and/or any other systems to maintain the test oil in an acceptable range.

In the low pressure embodiment of FIG. 1, test pump 154 may move oil through inlet valve 160 and through hose test assemblies 156. This may cause oil to go through outlet valve 170 and back to test oil tank 152. When inlet valve 160 allows oil to flow to hose test assembly 156, it may not allow flow of oil directly back into test oil tank 152. Test assembly 156 may include manifolds with one or more hose coupled in a test manner.

Valves 160 and 170 may be capable of operating at 700 bar and 150 degrees Celsius for millions of cycles. Valves may be better described in co-pending and co-filed patent application entitled "HIGH PRESSURE AND TEMPERATURE VALVE," having Ser. No. 61/577,772.

The control system 110 and test system 150 will not allow for comingling of oil. The test system 150 may have pressures exceeding 700 bar, while the control system 110 may be in the range of 200 bar. Furthermore, the test system 150 may include oil at temperatures exceeding 150 degrees Celsius, while the control system 110 may have oil only reaching 50 degrees Celsius. In an embodiment, test system 159 may operate around 700 bar, and may also operate at 212, 250, and 300 degrees Fahrenheit.

In this embodiment of the low pressure portion of the cycle, system pump 114 moves the piston 139 into a non-actuates position, and charges or fills accumulator 116. Valves 160 and 170 are in an "open" position, thereby allowing oil to flow through the hose test assembly 156.

Figure 2:
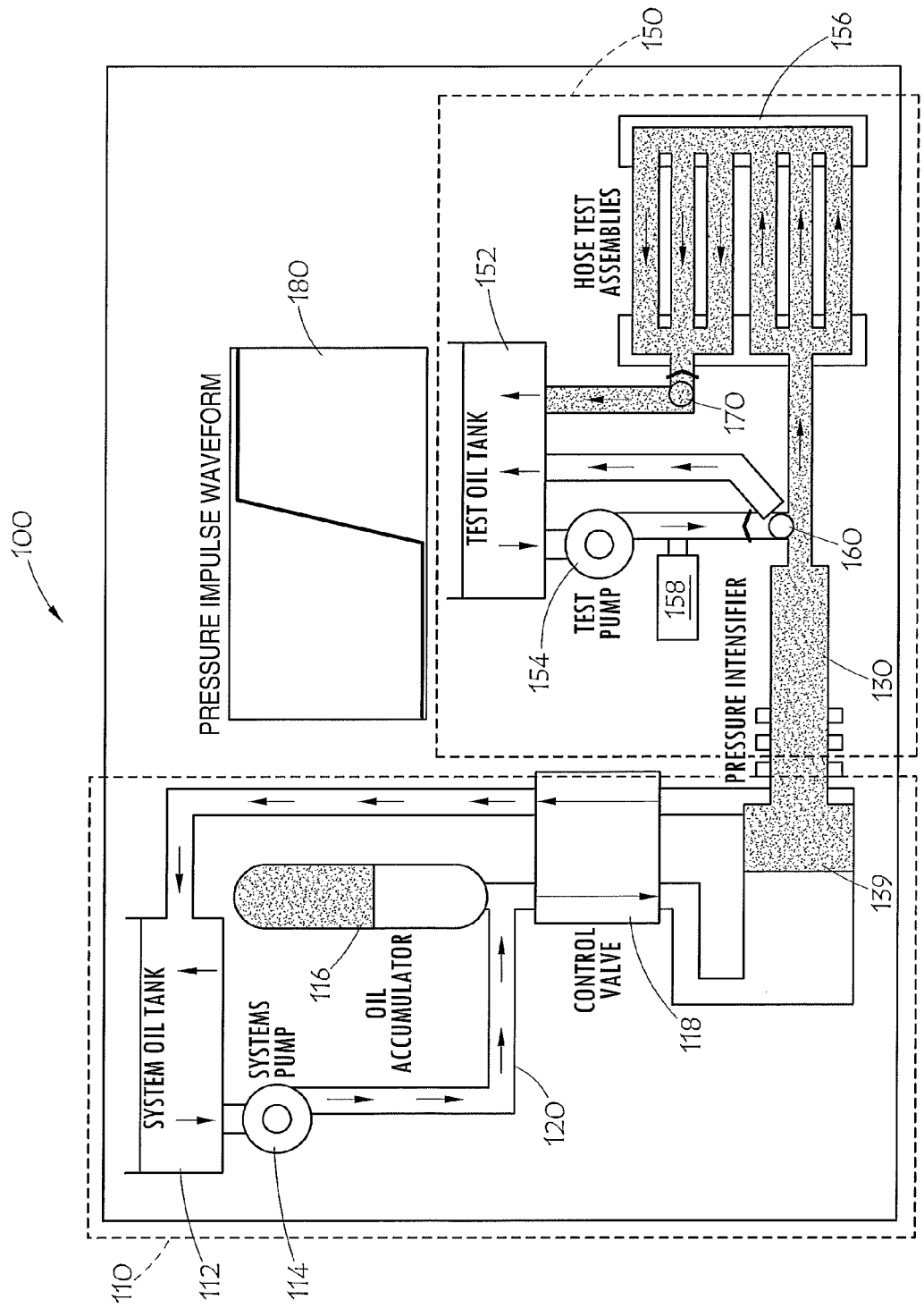
FIG. 2 is a block diagram of a hose tester at a high pressure state, according to an embodiment of the disclosure.

FIG. 2 shows an embodiment of a hose testing system 100, during a high pressure portion of operation. As seen generally at the right side of the pressure waveform 180, the pressure is generally at a high point of operation.

In this embodiment, control system 110 may operate in the following manner. Control valve 118 changes position to allow oil form the accumulator 116 which may cause piston 139 to move.

The test system 150 will operate as follows. Inlet valve 160 and outlet valve 170 will "close." Since piston 139 of intensifier 130 is moving generally forward, this will cause the pressure in test assembly 156 to rise relatively rapidly. Test pump 154 may continue to operate and cycle oil through inlet valve 160, back into test oil tank 152 as shown.

Once the acceptable high pressure is achieved within test system 150, the pressure may be held relatively constant for a period of time via piston 139, and system pump 114 may then charge accumulator 116. This period of time may typically be about 0.4 seconds, but may be 0.001-4 seconds. The total cycle time may be about 1 second, but may be 0.001-10 seconds. Acceptable high pressure may be from about 250-800 bar. In embodiments, the acceptable high pressure may be generally about 700 bar. It will be appreciated that this is an embodiment of pressures and temperatures, many, many other temperatures and pressures may be tested, along with many different hoses, with test system 100.

Once an acceptable period of time has passed at the acceptable high pressure, valves 160 and 170 may open, control valve 118 may change positions, and a low pressure portion of the cycle may start. Control system 110 would then move piston 139 back to reduce pressure, as will opening of valves 160 and 170. The cycle may then start over again.

Intensifier 130 may be made of carbon steel, and flash chromed to harden and to stop abrasion. This chroming may have the added benefit of allowing seals with the intensifier 130 to last longer, thereby decreasing maintenance time and cost. Furthermore, intensifier 130 made be formed from a single block of carbon steel which may allow for less failures and thereby reduced maintenance time and cost. Yet further, intensifier 130 may be water or other liquid cooled to increase life, thereby reducing maintenance time and cost. The oil used may be HD 46 or other type of oil.

Figure 3:
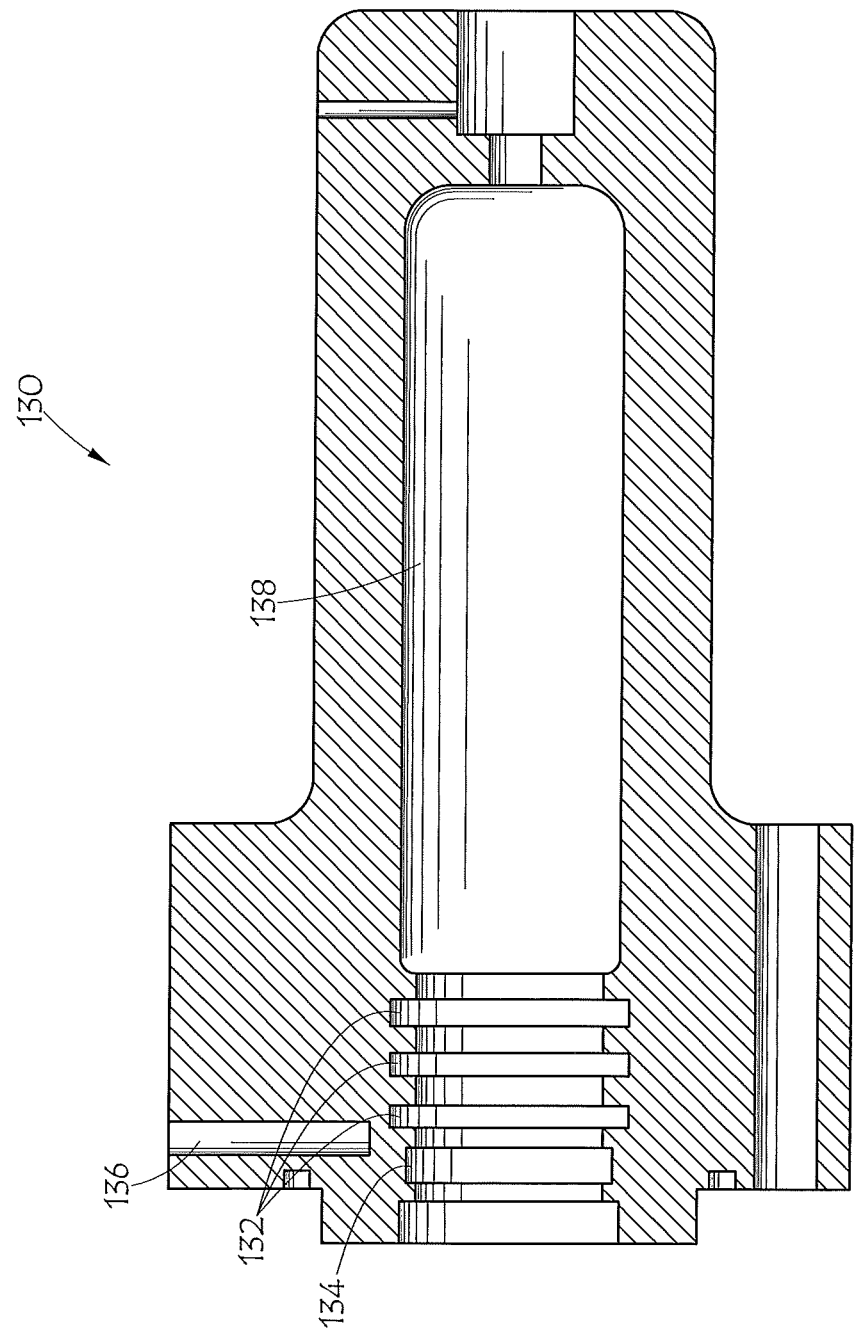
FIG. 3 is a cutaway view of an intensifier, according to an embodiment.

FIG. 3 is a cutaway view of an intensifier 130, according to an embodiment. Intensifier 130 may include high pressure groove(s) 132, which may be configured to receive seal(s) (not shown). Intensifier 130 may also include a low pressure groove 134, which may be capable of receiving a low pressure seal (not shown). Intensifier 130 may also include a barrel 138, which may be configured to generally enclose a piston 139 (not shown). Also, intensifier 130 may include an orifice 136.

Low pressure groove 134 and seal may keep the relatively low pressure control system oil from being mingles with the relatively high pressure and temperature test system oil.

High pressure grooves 132 and seals may be capable of withstanding high pressures (above 700 bar). When the seals start to fail, oil may pass the grooves 132 and begin to exit the intensifier 130 through orifice 136. This may indicate to the operator, or other maintenance person that maintenance is needed. This may reduce the likelihood of catastrophic failure of the intensifier 130 at high pressures and temperatures. Furthermore, this may reduce the amount of damage to the intensifier from a fail seal at high temperature and pressure. Yet, further, this may reduce the maintenance time and cost.

Stationary seals, as opposed to seal on the piston, may wear less and last longer. This would increase uptime and seal life, and reduce maintenance time and cost.

It will be appreciated that any number of high pressure grooves and seals may be used without straying from the scope of this disclosure. Similarly, any number of low pressure grooves and seals may be used as well.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The disclosure disclosed herein may suitably be practiced in the absence of any element that is not specifically disclosed herein.

What is claimed is:

1. A hose test system, comprising:
 a control system operatively coupled to a test system, said test system comprising:
 a hose test assembly configured to connect to a hose to be tested, and between an inlet high pressure valve and an outlet high pressure valve;
 an intensifier coupled to said inlet high pressure valve, capable of increasing the pressure within said hose test assembly when said inlet high pressure valve and said outlet high pressure valve are closed;
 wherein said control system is capable of controlling the operation of said intensifier of said test system.

2. The hose test system of claim 1, wherein said intensifier comprises:
 a barrel capable of encompassing a piston, wherein said barrel comprises one or more grooves capable of housing high pressure seals, said grooves being located between said piston and an orifice;
 wherein said orifice is configured to allow the oil within the test system to flow out of the intensifier when said one or more seals allow oil to pass, thereby indicating said intensifier is in need of service.

3. The hose test system of 1, wherein said test system further comprises a test oil tank coupled to a test pump and said outlet high pressure valve, said oil tank being capable of storing oil used within said test system.

4. The hose test system of claim 3, wherein said test pump is coupled to said inlet high pressure valve, and capable of circulating oil within said test system.

5. The hose test system of 1, wherein said test system further comprises an oil temperature control system coupled to said test oil tank capable of regulating the temperature of oil used within said test system.

6. An intensifier capable of being used with a hose test system and capable of increasing the pressure within said hose test assembly, said intensifier comprising:

a barrel capable of encompassing a piston, wherein said barrel comprises one or more grooves capable of housing high pressure seals, said grooves being located between said piston and an orifice;

wherein said orifice is configured to allow the oil within the test system to flow out of the intensifier when said one or more seals allow oil to pass, thereby indicating said intensifier is in need of service.

7. The intensifier of claim 6, wherein said seals are capable of withstanding pressures of 400-800 bar for at least a million cycles.

8. The intensifier of claim 7, wherein said intensifier is capable of withstanding temperatures of up to 350 degrees Fahrenheit for a million cycles.

9. A method testing industrial and automotive hoses, comprising:

cycling the pressure of high pressure and temperature oil within one or more hoses in part by actuating a pressure intensifier, said intensifier comprising a barrel capable of encompassing a piston, wherein said barrel comprises one or more grooves capable of housing high pressure seals, said grooves being located between said piston and an orifice;

wherein said orifice is configured to allow the oil within the test system to flow out of the intensifier when said one or more seals allow oil to pass, thereby indicating said intensifier is in need of servicing.

10. The method of testing industrial and automotive hoses of claim 9, wherein said cycling comprises:

raising the pressure of the oil within the test system at least in part via said intensifier controlled by a control system;

isolating said one or more hoses at least in part by closing one or more high pressure valves;

maintain the pressure at a high pressure for a period of time; and lowering the pressure of the oil at least in part by opening said one or more high pressure valves.

11. The method of claim 10, further comprising maintaining the temperature of the oil at a predetermined temperature.

12. The method of claim 11, wherein said maintaining the temperature comprises maintaining the temperature at about 200-400 degrees Fahrenheit.

13. The method of claim 10, wherein said raising the pressure comprises raising the pressure to about 500-800 bar.

14. The method of claim 10, wherein said actuating said intensifier comprises actuating said intensifier at least in part via a control system, which comprises a pump operatively coupled to said intensifier, and to a system pump.

\* \* \* \* \*